Patented May 16, 1950

2,508,343

UNITED STATES PATENT OFFICE 2,508,343

POLYVINYL ACETATE EMULSION

Wilfred K. Wilson, Springfield, Mass., assignor to Shawinigan Resins Corporation, Springfield, Mass., a corporation of Massachusetts No Drawing. Application November 22, 1946, Serial No. 711,793

2 Claims. (Cl. 260—17.4)

This invention relates to the emulsion polymerization of vinyl acetate.

Various methods have been proposed for polymerizing aqueous emulsions of vinyl acetate. Usually the object of such processes has been the production of stable emulsions. However, such prior processes have tended to be deficient in certain respects. For example, difficulty has been encountered in producing emulsions with a high concentration of polymer particles of small and uniform particle size. Other difficulties encountered include lack of stability of the emulsion, poor filming properties, etc.

It is an object of this invention to provide aqueous emulsions of polyvinyl acetate. A particular object is to provide stable aqueous emulsions of polyvinyl acetate which are characterized by small and uniform particle size, good filming properties and a polymer:water ratio greater than 25:100. A further object is to provide a new process for polymerizing vinyl acetate in aqueous emulsion.

These and other objects are attained according to this invention by polymerizing vinyl acetate as the dispersed phase of an aqueous emulsion protected by a combination of a non-polymerizable alkali metal sulfonate of an organic compound having 10-20 carbon atoms and gum arabic, the initial amount of monomer that is introduced not exceeding about 25 parts by weight for every 100 parts of water present and the remainder being added at such a rate that this ratio of monomer to water is not exceeded throughout substantially the entire polymerization period. By operating in this manner, emulsions of unexpectedly fine and uniform particle size may be prepared. Thus, polyvinyl acetate emulsions having particles with an average diameter of not over about 2 mu are obtained.

The following examples are illustrative of the present invention, but are not to be considered as limitative of the scope thereof. Where parts are given, they are parts by weight. In the tables below, the numerals refer to parts by weight.

In Table A are set forth the variations in type and amount of wetting agent used in Examples I-V.

The remaining ingredients of the examples and the procedure employed in each case are set forth below.

| | Parts |
|---|---|
| Vinyl acetate | 53 |
| Water | 44 |
| FeCl₃.6H₂O | 0.002 |
| Hydrogen peroxide | 0.02 |

About 10% of the vinyl acetate, 25% of the hydrogen peroxide and all of the remaining ingredients listed above are charged into a reaction vessel equipped with heating and cooling means, an agitator and a water-cooled return condenser. The mixture is then heated to about 75–85° C. with moderate agitation and while continuing the agitation and the same temperature, 75% of the remaining hydrogen peroxide (in a 0.3% aqueous solution) and all of the remaining vinyl acetate are slowly added. The rate of addition of these ingredients is such that maintenance of the 75–85° C. temperature is possible with little or no refluxing. About 2–3 hours are usually required. After all of the vinyl acetate is added, the remainder of the hydrogen peroxide (in a 0.3% aqueous solution) is introduced and the temperature of the mixture is raised to 85–90° C. After 15–30 minutes at this temperature, the mixture is cooled to room temperature.

TABLE A

| Example | I | II | III | IV | V |
|---|---|---|---|---|---|
| Gum Arabic | 2.5 | 2.0 | 2.5 | 2.5 | 2.5 |
| Sodium Salt of dioctyl sulfo-succinate | 0.15 | | | | |
| Santomerse #3 | | 0.20 | | | |
| Aresklene #400 | | | 0.1 | | |
| Nekal BX High Concentration | | | | 0.1 | |
| Invadine N | | | | | 0.1 |

The following example illustrates the preparation of an emulsion using a different type of polymerization catalyst, namely potassium persulfate.

Example VI

| | Parts |
|---|---|
| Vinyl acetate | 53 |
| Water | 42 |
| Gum Arabic | 3.5 |
| Santomerse #3 | 0.15 |
| Potassium persulfate | 0.2 |

About 5% of the vinyl acetate and all of the remaining ingredients are charged into the reaction vessel equipped with an agitator and water-cooled condenser. The mixture is then heated to about 75–85° C. with moderate agitation and while continuing the agitation and maintaining the same temperature, the remaining vinyl acetate is slowly added. The rate of addition of the vinyl acetate is such as to permit the maintenance of the 75–85° C. temperature with little or no refluxing. About 3 hours is required for the addition of the vinyl acetate. Thereafter the temperature of the reaction mixture is raised to 85–90° C. After 15–30 minutes at this temperature, the emulsion is cooled to room temperature.

The emulsions of the present invention as illustrated by the foregoing examples are characterized by unexpected and valuable properties as a result of the particular combination of dispersing means and polymerization conditions employed. Thus, these emulsions are characterized by containing polymer particles of a very small and substantially uniform size. For example, most of the particles in the emulsions of Examples I–VI vary in diameter from about 0.2 mu to not over 2.0 mu. Obviously, such a small and uniform particle size renders the emulsions of particular value for many applications. In addition, the emulsions generally are stable over long periods of time in that no "sludging" occurs. The emulsions are particularly adapted for casting films on various surfaces which, after drying, are characterized by clarity and high water resistance, particularly as evidenced by resistance to emulsification upon contact with water. Further advantages of these emulsions include good mechanical stability, i. e., freedom from de-emulsification or agglomeration on "rubbing" the emulsion between two surfaces.

Certain differences are to be noted between the several emulsions of Examples I–VI which render some of the products particularly valuable for certain purposes and others for other purposes. However, from the standpoint of stability and particle size characteristics, these emulsions are generally unexpectedly superior to emulsions prepared by other methods.

As an example of certain differences which result from variations in the nature and amounts of the various ingredients set forth in the examples, it is noted that a substantial proportion of the polyvinyl acetate in the product of Example I is insoluble in the usual solvents for polyvinyl acetate. On the other hand, the polymer contained in the product of Example II is soluble in the usual solvents for polyvinyl acetate and solutions of the polymer can be prepared which are within a readily measurable range of viscosities. The product in Example IV is especially characterized by freedom from clustering of the particles, i. e., the particles do not tend to cluster so as to produce an emulsion having a high apparent viscosity which is greatly decreased by rapid and vigorous agitation.

Other outstanding characteristics of the products of the examples include the unusually fine average diameter of the particles in the product of Example II (less than 1 mu) and the exceptional clarity and other valuable properties of films made therefrom.

The products are also characterized by freedom from "sludging" and "creaming" (separation of supernatant liquid) on standing for long periods of time.

As pointed out above, not over about 25 parts by weight of the polymerizable material for every 100 parts of water are initially introduced into the dispersing medium. Thereafter, the remainder of the monomer is preferably introduced at such a rate that this ratio of monomer to water is not exceeded. In contrast to such a process, if more than 25 parts of monomer is added initially, the average particle size of the polymer particles is greatly increased. However, within this range emulsions having an average particle size of less than 2 mu are readily obtained as is shown by the results in Table B, wherein the results of initially introducing 5, 10, 15 and 20% of the monomer are shown.

The charge in each of the examples in Table B is the following:

| | Parts |
|---|---|
| Vinyl acetate | 53 |
| Water | 44 |
| Gum Arabic | 2.5 |
| Acetic acid | 0.5 |
| Hydrogen peroxide | 0.04 |
| $FeCl_3 \cdot 6H_2O$ | 0.002 |

In carrying out the polymerization, the specified amount of vinyl acetate, 25% of the hydrogen peroxide and all of the remaining ingredients are charged into a reaction vessel equipped with an agitator and a water-cooled return condenser. The mixture is then heated to about 75–85° C. with moderate agitation, and while continuing the agitation and the same temperature, 75% of the remaining hydrogen peroxide (in a 0.3% aqueous solution) and all of the remaining vinyl acetate are slowly added. After all of the vinyl acetate is added, the remainder of the hydrogen peroxide (in a 0.3% aqueous solution) is introduced and the temperature of the mixture is raised to 85–90° C. After about 15 minutes at this temperature, the mixture is cooled to room temperature.

TABLE B

*Variation in initial vinyl acetate*

| Example | Proportion of total vinyl acetate added initially | Time for remaining monomer addition | Average particle size (mu) |
|---|---|---|---|
| | Per cent | Hours | |
| VII | 5 | 5 | <0.5 |
| VIII | 10 | 4¾ | <0.5 |
| IX | 15 | 4¼ | <1.0 |
| X | 20 | 3¾ | <1.5 |

While it is essential that the initial amount of monomer does not exceed the limit set forth above, rates of addition of the remaining monomeric material somewhat faster than those set forth above in Table B may be used when desired without adverse effect on the size of the polymer particles or of the clarity of films made from the emulsions. This is evident from consideration of the results set forth in Examples XI and XII in Table C in comparison with Example VII. The ingredients of the charges and the polymerization method in each case is the same as that used in examples in Table B except that the amount of monomeric vinyl acetate introduced initially is the same in each example and the period during which the remaining vinyl acetate is added is varied from 2 hours in Example XI to 5 hours in Example VII. However, in each case there is no excessive accumulation of monomer since the temperature of the mix is readily kept above the boiling point of the monomer.

TABLE C

*Variation in rate of addition of remaining vinyl acetate*

[5% of total added initially]

| Example | Time | Average Particle Size (mu) | Acidity | Viscosity (20° C.) | Film Clarity |
|---|---|---|---|---|---|
| | Hours | | Per cent | Cp. | |
| XI | 2 | <0.5 | 0.82 | 3240 | Very good. |
| XII | 3 | <0.5 | 0.96 | 1420 | Do. |
| VII | 5 | <0.5 | 1.15 | 1364 | Do. |

Example XIII

| | Parts |
|---|---|
| Vinyl acetate | 33 |
| Water | 64 |
| Gum Arabic | 2.5 |
| Santomerse #3 | 0.3 |
| $FeCl_3.6H_2O$ | 0.003 |
| Hydrogen Peroxide | 0.04 |

The polymerization is carried out in the same manner as that used in the examples in Table A. The product is characterized by the same desirable features as those possessed by the product in Example II, and, in addition, is characterized by an unusually low average particle size, 0.05–0.2 mu.

In general, it is found that emulsions in which the polymer particles possess such unusually low particle sizes may be prepared in accordance with the process of this invention if the weight ratio of water to the total vinyl acetate introduced and polymerized is maintained within the limits 100:30 to 100:60.

As pointed out above and as illustrated in the examples, the process of the invention comprises initially introducing not over about 25 parts of the monomeric material to be polymerized for each 100 parts of water and after polymerization has been initiated, introducing the remainder of the polymerizable material, either continuously or by stepwise addition. Preferably, the remainder of the monomeric material is introduced at such a rate that substantially through the polymerization the amount of unpolymerized material does not exceed about 25 parts for every 100 parts of water present. An alternative method of carrying out the polymerization comprises introducing the monomeric material substantially at the rate of polymerization throughout the reaction. For example, the mixture of water, wetting agent, catalyst and gum arabic may be heated to the selected reaction temperature and thereafter the monomer introduced at substantially its rate of polymerization.

The polymerization method of the invention is surprisingly found to be readily adapted to polymerization of vinyl acetate under atmospheric reflux conditions at temperatures below 100° C., but above the boiling point of vinyl acetate. Thus, following the initial addition of the vinyl acetate, the reaction mixture may be heated up to a polymerization temperature in excess of the boiling point of the vinyl acetate, i. e., 75–85° C. During the course of this heating period, sufficient vinyl acetate polymerizes so that the boiling point of the mixture increases to a temperature at least equal to the temperature selected for polymerization. Thereafter, the vinyl acetate may be added at such a rate that the boiling point of the reaction mixture continues to be at least equal to the selected polymerization temperature. The maximum rate at which the vinyl acetate may be added without causing the boiling point of the mixture to fall below the polymerization temperature is substantially the rate of polymerization of the monomer, particularly if the initial monomer-water ratio is not substantially less than 25:100, although it may be that an increasing accumulation of monomer is possible as the polymerization continues due to greater absorptive capacity of the mixture by virtue of increased quantity of polymer.

Usually the polymerization in aqueous emulsion is carried out at a pH of 2–7, and preferably within the range 4–6. When it is desired to lower the initial pH of the polymerizing mixture, various acids may be used for this purpose, such as formic acid, acetic acid, chloracetic acid, benzene sulfonic acid, toluene sulfonic acid, nitric acid, hydrochloric acid, sulfuric acid and the like.

The non-polymerizable surface tension depressants or wetting agents used in the process of the invention are the alkali metal sulfonates, e. g., sodium or potassium sulfonates of organic compounds containing 10–20 carbon atoms, as for example, alkali metal sulfonates of aliphatic or alkyl-aromatic hydrocarbons containing 10–20 carbon atoms such as the alkyl naphthalene alkali metal sulfonates, for example, isobutyl naphthalene sulfonates; sulfonates of alkyl esters of dicarboxylic acids, for example, the sodium salt of dioctyl sulfo-succinate (Aerosol OT); wetting agents marketed under the following trade names, Nekals, particularly Nekal BX High Concentration (sodium diisobutyl naphthalene sulfonate); Santomerses, e. g. Santomerse #3 (dodecyl benzene sodium sulfonate), and Santomerse D (decyl benzene sodium sulfonate), and other alkyl benzene alkali metal sulfonates, Aresklene (sodium disulfonate of dibutyl phenyl phenol), Invadine N (sodium alkyl naphthalene sulfonate). Particularly preferred is the class of wetting agents characterized by containing an alkali metal sulfonate group and one or more long chain alkyl groups, i. e., alkyl chains having 6–18 carbon atoms as exemplified by Santomerse #3, Santomerse D and the sodium sulfonate of dioctyl succinate, etc.

Numerous other variations may be introduced into the process of the invention as illustrated by the specific examples. For example, other polymerizing temperatures may be used, the exact temperature depending in part on the nature of the polymer desired. However, temperatures between 60° C. and 100° C. are usually employed, and furthermore, it has been noted that the activity of a complex catalyst comprising an iron compound and hydrogen peroxide or a material generating hydrogen peroxide, shows a sharp increase when the temperature is raised above about 70° C. When necessary, for example, to avoid escape of volatile materials, the polymerization may be carried out under pressure in a closed system.

Various water-soluble per compounds may be used in place of the peroxides employed in the examples, such as per-acetic acid, sodium perborate, potassium perborate, sodium persulfate, potassium persulfate, sodium peroxide, potassium peroxide, urea peroxide and the like. The amount employed is usually such as to contain 0.001–0.1 part of available oxygen for every 100 parts of water.

When the catalyst employed comprises a complex catalyst made with an iron compound and hydrogen peroxide, or a substance generating hydrogen peroxide during the polymerization, the iron compound initially may be either in the form of a ferrous or a ferric compound. Examples include the nitrates, chlorides, sulfates, acetates, sulfonic acid salts, e. g., the iron salts of benzene sulfonic acid, toluene sulfonic acid, and the like.

The amounts of hydrogen peroxide or hydrogen peroxide generating substance and the iron compounds used in complex catalysts may be substantially varied—the amounts employed in any particular charge depending upon such factors as the viscosity desired in the polymer, etc. In general, small amounts are sufficient and usually from 0.0002–0.004 part of combined iron and 0.01–0.20 part of hydrogen peroxide or an amount of an hydrogen peroxide generating substance equivalent thereto in available oxygen, i. e. 0.001-0.1 part of available oxygen are used for every 100 parts of water.

The amounts of wetting agent and gum arabic may be substantially varied. Large amounts of such materials are usually undesirable since they may adversely affect the characteristics of the product. On the other hand, a certain minimum is necessary for proper stability of the emulsion both during and after polymerization. Usually 0.01 part to 2.0 parts and preferably 0.1–1 part of a wetting agent and 1 to 10 parts of gum arabic per 100 parts of water are found to produce exceptionally valuable products.

In making aqueous emulsions of polymerized vinyl compounds according to the process of the invention, the ratio of water to polymerizable compound may be varied substantially. As pointed out above, a valuable feature of the invention resides in the fact that valuable emulsions are readily prepared which have a polymer:water ratio of over 25:100. Generally the total amount of vinyl acetate introduced and polymerized is much higher, e. g., weight ratios of vinyl acetate to water of between 40:60 and 60:40. Usually the weight ratio of water to the total vinyl acetate introduced and polymerized is not lower than 30:70 since the viscosity of the polymerizing mixture becomes too high to permit adequate agitation. A particularly valuable characteristic of the process of the invention resides in the fact that emulsions may be produced having an exceptionally high solids content, e. g., 40 to 60%, and in which the polymer is made up of particles of small and uniform particle size. However, as pointed out hereinbefore, emulsions containing particles of exceedingly fine and uniform size are obtained by employing somewhat lower vinyl acetate concentrations.

When a complex catalyst of the type used in Examples I-V is employed, it is most advantageous, as pointed out above, to add only a minor proportion of the hydrogen peroxide or hydrogen peroxide generating material to the initial charge. The proportion of the hydrogen peroxide that is added after the polymerization has been initiated may be varied substantially, e. g., 10–90%. However, it is preferred that the addition of a major proportion of the hydrogen peroxide be delayed, e. g., more than 50%, and preferably at least 70%. If desired, the addition of all of the hydrogen peroxide may be delayed until the mixture has reached the desired reaction temperature, provided such temperature does not exceed the boiling point of the mixture. However, a somewhat smoother reaction generally results if 10–30% of the hydrogen peroxide is added initially. Also, according to a preferred procedure, the addition of from 5–15% of the hydrogen peroxide is delayed until all of the polymerizable compound has been added.

When the vinyl compound and the hydrogen peroxide are added together, either continuously or by successive additions as the polymerization continues, the ratio of the two ingredients in each addition to the charge is preferably kept constant, e. g., by premixing the hydrogen peroxide and the vinyl compound and adding portions of the mixture.

The emulsions of the invention are especially valuable for forming films on various types of materials such as cloth, paper, wood, metals, glass and the like. The particularly valuable properties of films formed from these emulsions include resistance to water. Thus, prior emulsions of such materials as polyvinyl acetate tended to re-emulsify when immersed in water. Usually, when it is desired to form films from the emulsions, it is advantageous to add to the emulsions a small amount, e. g., 2 to 10%, of a plasticizer for the polyvinyl acetate. For example, such plasticizers as dibutyl phthalate and triethylene glycol dihexoate may be used. Films resulting from such products are characterized not only by resistance to water, but are uniform, clear and possess high wet strength after immersion in water.

This application is a continuation-in-part of my co-pending application Ser. No. 677,902, filed June 19, 1946, now U. S. Patent No. 2,508,341, which is a continuation-in-part of my co-pending application Ser. No. 648,574, filed February 18, 1946, now U. S. Patent No. 2,473,929.

It is to be understood that the above description is given by way of illustration only, and not of limitation, and that deviations are possible within the spirit of the invention.

The abbreviation "mu" is used to represent "micron" wherever it appears in the specification and claims.

What is claimed is:

1. A process for preparing a stable aqueous emulsion of polyvinyl acetate which comprises polymerizing vinyl acetate while dispersed in an aqueous medium containing for every 100 parts of water, 1–10 parts of gum arabic, 0.01–2.0 parts of a non-polymerizable surface tension depressant characterized by containing an alkali metal sulfonate group and 10–20 carbon atoms and a sufficient amount of water soluble per compound to supply 0.001–0.1 part of available oxygen, the vinyl acetate being introduced at such a rate that not over about 25 parts of monomer for every 100 parts of water are present substantially throughout the polymerization, the weight ratio of water to total vinyl acetate introduced and polymerized is between 100:30 and 100:60, whereby the polymer particles have a diameter of 0.05–0.2 micron.

2. A stable aqueous polyvinyl acetate emulsion in which the polymer particles have a diameter of 0.05–0.2 micron, said emulsion having a water: polyvinyl acetate weight ratio between 100:30 and 100:60 and said emulsion being produced by the process defined in claim 1.

WILFRED K. WILSON.

REFERENCES CITED

The following references are of record in the file of this patent:

UNITED STATES PATENTS

| Number | Name | Date |
|---|---|---|
| 2,068,424 | Mark et al. | Jan. 19, 1937 |
| 2,109,981 | Voss et al. | Mar. 1, 1938 |
| 2,339,184 | Neher et al. | Jan. 11, 1944 |
| 2,363,951 | Fikentscher | Nov. 28, 1944 |
| 2,388,600 | Collins | Nov. 6, 1945 |
| 2,398,344 | Collins et al. | Apr. 16, 1946 |
| 2,444,396 | Collins et al. | June 29, 1948 |